STEREOPHONIC FM RECEIVERS

Filed May 28, 1963

INVENTORS
RICHARD SANTILLI & LOVA PLUS
By Eugene M. Whitacre
Attorney 3,264,414

STEREOPHONIC FM RECEIVERS

Richard Santilli, Somerville, and Lova Plus, South Bound Brook, N.J., assignors to Radio Corporation of America, a corporation of Delaware Filed May 28, 1963, Ser. No. 283,811
4 Claims. (Cl. 179—15)

Figures 1, 2:
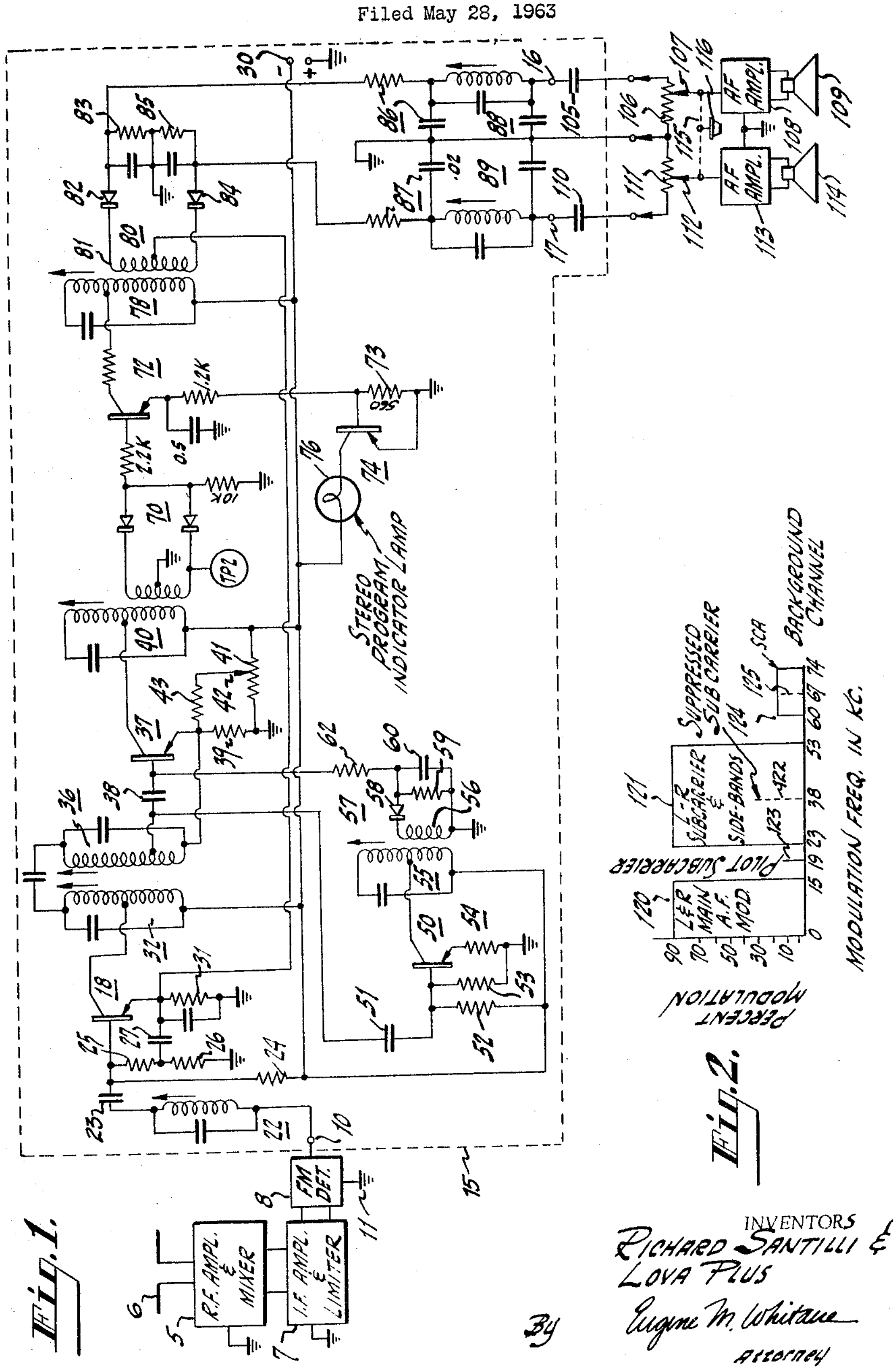

The present invention relates to stereophonic multiplex radio signal receivers, and more particularly to compatible stereophonic multiplex frequency-modulation (FM) radio receivers which operate in response to both monophonic and stereopohnic signal information on a single modulated carrier wave.

In such receivers, under the present standards, the carrier wave is frequency-modulated by the sum of two stereophonically related audio frequency signals in the usual manner for FM broadcast and compatible reception by existing monophonic receivers. However, for stereophonic reception, the carrier wave is further provided with stereophonic information effective for signal separation, in the form of a suppressed subcarrier signal at 38 kc. which is amplitude-modulated with the difference of the two stereophonic-related signals to be transmitted, and a 19 kc. pilot signal for use in demodulating the suppressed subcarrier sidebands.

The compatible composite stereophonic signal at the multiplex output circuit of a frequency-modulation detector of an FM receiver is thus composed of the main frequency-modulation signal component, which is the compatible signal used by an unmodified or monophonic frequency-modulation receiver, a 19 kc. (kilocycles per second) pilot signal, and sidebands representative the difference-frequency (L–R) signal extending from 23 kc. to 53 kc.

When a frequency modulation station to which the reciver is tuned is not transmitting a pilot signal (19 kc.) and broadcasts monaural or single channel program material, or when the received stereophonic signals are too weak for proper stereophonic reproduction, it is desirable to automatically disable the subcarrier demodulation process and to translate the received transmission as a monaural signal. If the subcarrier channel is not disabled during monophonic or weak stereophonic signal reception, noise is passed therethrough and degrades the receiver performance. Where automatic circuitry is used to disable the subcarrier channel as a function of the presence or absence of the pilot signal, noise contained in a monophonic or weak stereophonic signal at the pilot signal tends to activate the automatic circuitry to open the channel to noise amplification.

It is accordingly an object of this invention to provide an improved stereophonic multiplex unit for FM receivers.

A further object of this invention is to provide an improved stereophonic multiplex circuit for use with FM receivers which automatically permits the translation of monaural or stereophonic transmissions without the need for manual switching.

Another object of the invention is to provide improved automatic snap-action type stereophonic-monaural switching circuitry which provides a hysteresis effect so that the received signal threshold level required to activate the circuit for stereophonic reception is greater than signal level required to maintain the circuit in the stereophonic reception mode.

In circuits embodying the invention, the composite stereophonic signal from the FM receiver demodulator is fed to circuitry for separating the pilot signal from the remainder of the composite signal. The pilot signal is then fed in parallel to an amplifier-limiter circuit and to a threshold detector circuit. The threshold detector circuit operates to control the bias on the amplifier-limiter circuit in such a manner that the amplifier-limiter circuit is cut off when the received pilot signals are absent or below a predetermined threshold level. When the pilot signal amplitude exceeds the predetermined threshold level, the threshold detector circuit starts to develop a control voltage which counteracts the cutoff bias on the amplifier limiter. The input circuit connections to the threshold detector are such that a portion of the pilot signal translated by the amplifier-limiter circuit is added to the pilot signal supplied from the pilot separating circuitry to insure a snap-action type activation of the amplifier-limiter circuit. Once the amplifier-limiter is operative, its operating point remains substantially constant with decreasing levels of pilot signal, down to a level where the amplifier-limiter circuit snaps to its cutoff condition.

The novel features which are considered to be characteristic of this invention are set forth with particularity in the appended claims. The invention, itself, however, both as to its organization and method of operation as well as additional objects and advantages thereof will best be understood from the following description when read in connection with the accompanying drawings in which:

FIGURE 1 is a schematic circuit diagram of a stereophonic multiplex demodulator unit embodying the invention, shown in connection with an FM receiver and an audio amplifier in block form; and FIGURE 2 is a graph indicating the range of frequency spectrum and modulation components of a composite modulation signal as applied to the stereophonic multiplex unit of FIGURE 1, with reference to certain operating features of the invention.

Referring to the drawings and more particularly to FIGURE 1, the receiver circuit shown in block form is representative of a frequency modulation receiver adapted for stereophonic multiplex operation. In this respect it is provided with the usual R.-F. amplifier and mixer 5 tunable through the frequency-modulation band of 88 to 108 mc., and coupled to antenna means 6. The R.-F. amplifier and mixer 5 is coupled to an I.-F. amplifier and limiter 7 which is followed by a suitable FM detector 8. The FM detector 8 includes a pair of output terminals 10 and 11 across which are developed a composite signal comprising: the $(L+R)$ signals, the subcarrier sidebands representative of the $(L-R)$ signal and the 19 kc. pilot signal.

Connected with the multiplex output circuit or terminals 10–11 of the FM detector 8 is a stereophonic multiplex unit 15 for deriving two stereophonically-related (L and R) or the like modulation signals from the composite signal at the FM detector output terminals. This unit may be added to existing receivers or may be built integrally therewith during manufacture, and provides, at two stereo or channel output terminals 16 and 17, the separated modulation component signals such as the L and R stereo signals in the present example.

The stereo multiplex unit 15, includes a preamplifier stage comprising a transistor 18. Signals from the FM detector 8 output terminals 10 and 11 are fed through a coupling network including a parallel resonant trap 22 and a coupling capacitor 23 to the base electrode of the transistor 18. The trap 22 is tuned for best rejection across the SCA (Subsidiary Communications Allocation) band.

A voltage divider including the resistors 24, 25 and 26 connected in series across the terminals of an operating potential supply source 30, sets the base bias of the transistor 18 for substantially linear amplification. The junction of the resistors 25 and 26 is connected to the transistor 18 emitter electrode through a signal coupling capacitor 27. The composite signal from the FM detector 8 is developed across a load resistor 31 connected between the emitter and ground. In addition, the transistor 18 operates as an amplifier for the pilot signal, and has a parallel resonant tank circuit 32 tuned to 19 kc. connected between the collector electrode thereof and the negative terminal 30 of an operating potential supply source.

The pilot signal components developed in the tank circuit 32 are coupled to a secondary circuit 36 which is also tuned to the pilot signal frequency. The secondary circuit 36 comprises the input circuit of a pilot signal amplifier-limiter stage including a transistor 37. The base electrode of the transistor 37 is tapped into secondary circuit 36 through a capacitor 38.

The amplifier-limiter stage including the transistor 37 has an unbypassed emitter resistor 39. The resistor 39 is not degenerative in this stage since the signal input from the secondary circuit 36 is applied directly between the base and emitter electrodes of the transistor. Actually, the resistor 39 forms a part of the amplifier load impedance supplementing the tuned circuit 40 which is coupled to the collector electrode of the transistor 37.

Under no signal conditions, the transistor 37 is cut off by a reverse biased voltage applied to the emitter electrode through a threshold control potentiometer 41. An adjustable tap 42 on the potentiometer 41 is coupled to the emitter electrode of the transistor 37 through a reverse current limiting resistor 43. The resistor 43 is sufficiently large that the reverse bias current between the base and emitter of the transistor 37 does not exceed the transistor's specification.

A threshold amplifier including a transistor 50 is also coupled to the secondary circuit 36 through a capacitor 51. A voltage divider comprising a pair of resistors 52 and 53 connected in series across the source of operating potential 30 provide the proper base bias voltage for the transistor 50. An emitter resistor 54 which is unbypassed is included in the threshold amplifier circuit to raise its input impedance to avoid loading of the secondary circuit 36. In addition, a tuned load circuit 55 tuned to the pilot signal frequency is coupled to the collector of the transistor 50. As will be understood, the threshold amplifier is essentially a linear 19 kc. pilot signal amplifier.

Signals developed in the tuned circuit 55 are applied through a secondary winding 56 to a threshold detector circuit 57 which includes a rectifier 58 and load resistor 59, the latter being bypassed for pilot signal frequencies by a capacitor 60. The D.C. voltage developed across the load resistor 59 of the threshold detector circuit is applied to the base of the 19 kc. amplifier-limiter transistor 37 through an isolation resistor 62.

During the reception of monophonic signals or of stereophonic signals where the pilot signal is too weak to provide acceptable stereophonic operation, the forward bias developed by the threshold detector circuit 57 is not sufficient to overcome the reverse bias applied by the threshold control potentiometer 41 so that the amplifier-limiter stage transistor 37 remains cutoff. Under these conditions the signal input to the threshold amplifier transistor 50 consists solely of the voltage applied thereto from the secondary circuit 36.

When the pilot level is sufficiently high, the bias voltage developed across the resistor 59 becomes sufficiently negative to overcome the reverse bias voltage applied to the transistor 37 by the threshold control potentiometer 41. At this point the transistor 37 begins to translate the pilot signal developed in the secondary circuit 36 to its load circuit comprising the tuned circuit 40 and the emitter resistor 39. The amplified signal appearing across the resistor 39 is added to the voltage appearing in the secondary circuit 36 to form the input signal for the threshold amplifier transistor 50. The increased drive on the threshold amplifier transistor 50 produces a greater forward bias control voltage for the amplifier-limiter transistor 37. The signal feedback from resistor 39 causes a snap-action type of switching to bias the transistor 37 at its optimum operating point for maximum gain.

Once the 19 kc. amplifier-limiter stage is activated, its operating point will remain approximately constant with decreasing pilot signal level down to level where the forward bias developed by the threshold detector circuit 57 will be overcome by the reverse threshold bias from the potentiometer 41. The reason that the operating point of the transistor 37 remains substantially constant is because after a certain level of pilot signal level is reached, the transistor 50 operates between saturation and cutoff. Hence further changes in pilot signal level do not produce a change in the signal level applied to the threshold detector 57. As a result of the feedback circuit the pull-in and drop-out pilot levels follows a hysteresis loop such that the threshold level to switch the circuit for stereophonic operation is greater than the level which causes the circuit to be switched back to its monophonic condition. The differences in pull-in and drop-out signal levels maintains the circuit in the stereophonic mode over a wide range of received signal levels, once the circuitry is actuated for stereophonic operation.

With the threshold control potentiometer in its minimum resistance condition, i.e., with the tap 42 at ground, no reverse bias is applied to the transistor 37 and the system becomes almost linear. This position of the threshold control potentiometer facilitates alignment of the multiplex demodulator unit embodying the invention.

The desirable range of threshold control expressed in terms of tuner input signal levels at which the stereophonic subchannel will be switched on and off, depend on the signal-to-noise and limiting characteristics of the tuner used in connection with the stereo multiplex demodulator. If a lower gain tuner is used which has poorer limiting or poorer signal-to-noise ratio, it may be desirable to adjust the threshold control potentiometer to cutoff the subcarrier channel in higher levels of pilot signal input voltage. The value of the isolation resistor 62 affects the D.C. stability of the transistor stage 37, and influences the ratio of "pull-in" to "drop-out" levels, since this resistor together with the resistors 39 and 59 control the base current of the transistor 37.

The 19 kc. pilot signal developed in the tuned circuit 40 is applied to a full wave rectifier which serves as a frequency doubler circuit 70 which provides a D.C. voltage which pulsates at a 38 kc. rate. This voltage is applied to a 38 kc. amplifier stage 72 which is normally biased to cutoff. When a pilot signal is received and translated to the full wave frequency douber stage 70, it is rectified to produce the D.C. voltage which turns on the 38 kc. amplifier 72. Under these conditions the amplifier stage 72 draws emitter current which develops a turn on voltage across an emitter resistor 73 for a lamp switching circuit 74. The lamp switching circuit 74 includes a transistor which is connected to control the current through a stereo program indicator lamp 76 connected in the collector-electrode circuit thereof. From the foregoing it will be seen that the lamp 76 is energized when and only when the multiplex circuit is activated for stereophonic reception.

The demodulating or switching voltage at 38 kc. developed in the tuned circuit 78 is coupled to a time division multiplex detector circuit which is operative to derive left (L) and right (R) signals directly from the composite signal. The detector circuit includes a center-tapped winding 81 coupled to the resonant circuit 78, with the composite signals developed across the resistor 31 being applied to the centertap. The left channel output signals are detected by a series connected diode 82 and resistor 83 connected to one end of the inductor 60. The right channel signals are detected by a diode 84 and a series connected resistor 85 connected to the other end of the winding 81. The left and right channel output signals from the detector are applied through deemphasis networks 86 and 87, respectively, low-pass filters 88 and 89 for removing 38 kc. switching components, to the output terminals 16 and 17, respectively.

A negative D.C. voltage developed across the resistor 31 is also applied to the centertap of the winding 81. The negative voltage at tap 81 forward biases the diodes 82 and 84 so that, during monophonic reception, audio signal will be linearly passed. The 38 kc. switching signal which is present during stereophonic reception is sufficiently large in amplitude relative to the negative D.C. voltage to switch the diodes 82 and 84 on and off to effect a sampling type detection.

The radio receiver signal translating system includes suitable means connected with the terminal 16 and 17 of the stereophonic multiplex unit to amplify and reproduce the left and right audio frequency signals. To this end, the terminal 16 is coupled through a capacitor 105 to an output volume control potentiometer 106 having an output volume contact 107 connected with a suitable audio frequency channel amplifier 108, as indicated, which has a common ground return connection and is connected to drive a left channel output loudspeaker 109.

Likewise, the output terminal 17 is coupled through a capacitor 110 to a second channel volume control potentiometer resistor 111 having an output volume control contact 112 connected to the second channel amplifier means 113, having a common ground return connection and a right channel output loudspeaker 114. The volume control means may be ganged, if desired, for joint operation as indicated by the dotted line connection 115 and the common volume control knob represented at 116 in connection therewith. This dual channel signal translation circuit and sound reproducing output means therefore is representative of any suitable means of this type normally provided in a stereophonic sound reproducing system.

Referring now to FIGURE 2 along with FIGURE 1 the operation of the multiplex unit in the receiver may now be considered. The composite signal at the multiplex output terminals 10–11 of the FM detector 8 when the receiver is responding to compatible stereophonic signals, may be represented by the graph of FIGURE 2 drawn with reference to the FM carrier modulation frequency in kilocycles along the abscissa and percentage modulation along the ordinate which also indicates relative amplitudes of subcarrier signals. It will be seen that the total signal is composed of an $(L+R)$ component 120 which may provide as much as 90% modulation and an $(L-R)$ double-sideband suppressed-carrier AM signal component 121 which may also modulate the carrier up to 90% as indicated. In other words when the component 120 is maximum, the component 121 is minimum.

In the graph of FIGURE 2 it is assumed that the audio frequency modulation will extend from zero to 15 kc. As a practical matter it is known that the modulation frequency actually may extend between 50 cycles and slightly less than 15 kc., depending upon the fidelity of the studio equipment used for modulating the system. The restored suppressed-carrier signal indicated by the dotted line 122 is at 38 kc. and is the second harmonic of the 19 kc. pilot carrier represented at 123 and is maintained at a constant phase relationship. The sidebands of the suppressed subcarrier extend substantially from 23 kc to 53 kc. as indicated, thereby to provide for substantially the full 15 kc. modulation referred to.

The possible SCA background music channel is indicated by the block 124 and extends 7 kc. on either side of a 67 kc. subcarrier signal indicated by the dotted line 125.

When a stereophonic FM signal is being received by the FM receiver, (and assuming an SCA signal present) a composite signal as represented in FIGURE 2 is developed across the output terminals of the FM detector 8.

What is claimed is:

1. A circuit for frequency-modulation stereophonic receivers comprising:
a circuit for connection to a source of demodulated frequency-modulation signals which during monophonic reception comprise audio-frequency signals and which during stereophonic signal reception includes: (1) audio-frequency signals, (2) subcarrier sideband signals, (3) a pilot signal,
means for separating said pilot signal from the remainder of said composite signal,
a signal translating stage having an input circuit coupled to receive said pilot signal and an output circuit for said pilot signal,
means including a detector circuit coupled to said signal translating stage for maintaining said signal translating stage cutoff during monophonic reception when said pilot signal is absent and for conditioning said signal translating stage for operation during stereophonic reception when said pilot signal is present, and
means coupling said detector circuit to receive said pilot signal from said separating means and from the output circuit of said signal translating means.

2. A circuit for frequency-modulation stereophonic receivers comprising:
a circuit for connection to a source of demodulated frequency-modulation signals which during monophonic reception comprise audio-frequency signals and which during stereophonic signal reception includes: (1) audio-frequency signals, (2) subcarrier sideband signals, (3) a pilot signal,
means for separating said pilot signal from the remainder of said composite signal,
a signal translating stage having an input circuit coupled to receive said pilot signal and an output circuit for said pilot signal,
means including a detector circuit coupled to said signal translating stage for maintaining said signal translating stage cutoff during monophonic reception when said pilot signal is absent and for conditioning said signal translating stage for operation during stereophonic reception when said pilot signal is present, and
an input circuit for said detector circuit including at least a portion of said input circuit and a portion of said output circuit of said signal translating means.

3. A circuit for frequency-modulation stereophonic receivers comprising:
a circuit for connection to a source of demodulated frequency-modulation signals which during monophonic reception comprise audio-frequency signals and which during stereophonic signal reception includes: (1) audio-frequency signals, (2) subcarrier sideband signals, (3) a pilot signal,
means for separating said pilot signal from the remainder of said composite signal,
a signal translating stage including an active device having input, output and common electrodes, an input circuit connected between said input and common electrodes to receive said pilot signal, and an output circuit including a circuit tuned to said pilot frequency connected between said output electrode and a point of reference potential for alternating currents and an impedance element connected between said common electrode and a point of reference potential for alternating currents,
means including a detector circuit having an input circuit including said signal translating stage input circuit and impedance element in series, and a load impedance element direct current conductively connected to said input electrode of said signal translating stage, said detector circuit operative to bias said transistor in the direction of forward bias in response to appled pilot signals, and means providing a reverse bias voltage source coupled to one of said input and common electrodes to maintain said active device cutoff in the absence of pilot signals.

4. In a multiplex detector for frequency modulation stereophonic receivers, the combination comprising:

an input circuit for connection to a source of demodulated frequency modulation signals which during monophonic reception comprise audio frequency signals and which during stereophonic signal reception include; (1) audio frequency signals, (2) subcarrier sideband signals, (3) a pilot signal, means for separating said pilot signal from the remainder of said composite signal, an amplifier-limiter stage including a transistor having a base, emitter and collector electrodes, an input circuit for receiving said separated pilot signal connected between said base and emitter electrodes, load impedance means for said amplifier comprising a tuned circuit responsive to said pilot signal coupled between said collector electrode and a point of reference potential for alternating currents, and a resistor connected between said emitter electrode and said point of reference potential for alternating currents, means for applying a reverse bias voltage between said base and emitter electrodes for maintaining said transistor cutoff during monophonic reception, means providing a threshold amplifier circuit coupled between said base electrode and said point of reference potential for alternating currents, an output circuit for said threshold amplifier comprising a circuit responsive to the frequency of said pilot signal, a threshold detector circuit coupled to said threshold amplifier output circuit for rectifying the signal applied to said threshold amplifier to produce a direct control voltage, and means for applying said control voltage between said base and emitter electrodes in a polarity to overcome the reverse bias applied to said emitter electrode whereby said transistor is rendered conductive in the presence of pilot signals of sufficient amplitude to produce a control voltage to overcome said reverse bias voltage.

References Cited by the Examiner

UNITED STATES PATENTS

| | | | |
|---|---|---|---|
| 3,219,760 | 11/1965 | Loughlin | 179—15 |
| 3,225,143 | 12/1965 | Parker | 179—15 |

DAVID G. REDINBAUGH, *Primary Examiner.*

R. L. GRIFFIN, *Assistant Examiner.*